United States Patent [19]

Niksa

[11] 4,344,633
[45] Aug. 17, 1982

[54] GASKET FOR ELECTROLYTIC CELL
[75] Inventor: Andrew J. Niksa, Concord, Ohio
[73] Assignee: Diamond Shamrock Corporation, Dallas, Tex.
[21] Appl. No.: 266,447
[22] Filed: May 22, 1981
[51] Int. Cl.³ .......................... F16J 15/10; C25B 9/00
[52] U.S. Cl. ............................ 277/228; 277/DIG. 6; 204/279
[58] Field of Search ............... 204/253, 254, 258, 279; 277/DIG. 6, 227, 228

[56]  References Cited
U.S. PATENT DOCUMENTS

| 3,450,621 | 6/1969 | Anderson | 204/279 X |
| 3,794,577 | 2/1974 | Oliver et al. | 204/279 X |
| 4,087,343 | 5/1978 | Custer et al. | 204/279 X |
| 4,100,053 | 7/1978 | Anderson | 204/279 |
| 4,175,025 | 11/1979 | Creamer et al. | 204/253 |

FOREIGN PATENT DOCUMENTS 1078129  8/1967  United Kingdom ............... 204/254

*Primary Examiner*—Robert S. Ward, Jr.
*Attorney, Agent, or Firm*—Woodrow W. Ban

[57]  ABSTRACT

An improved multi-layer electrode gasket comprising an outboard layer of a material having a combination of a Type A Shore Scale Durometer hardness (ASTM Specification D-2240-75) ranging from about 40 to about 70 and a Compression Set (ASTM Specification D-395-69-Method A) of zero plus to about 40 percent with an inboard barrier layer of a material which is corrosion-resistant, noncontaminating and stable upon contact with the electrolyte in conjunction with the electrode chamber in which it is used.

11 Claims, 2 Drawing Figures

FIG. I

GASKET FOR ELECTROLYTIC CELL

BACKGROUND OF THE INVENTION

The electrolytic production of chlorine and caustic soda by the electrolysis of brine, viz., an aqueous media containing sodium chloride, has been well-known for many years. Electrolytic cells for chlor-alkali synthesis have historically been of three types, viz., diaphragm cells, mercury cells and membrane cells.

Diaphragm cells use a hydraulically-permeable diaphragm, usually made of asbestos, which is customarily vacuum deposited onto a foraminous cathode substrate, e.g., steel. Diaphragm chlor-alkali cells have been widely commercialized. Such diaphragm cells, employing permeable diaphragms, produce sodium chloride-containing sodium hydroxide catholytes because sodium chloride passes through the diaphragm from the anolyte to the catholyte. Such sodium chloride-containing caustic generally requires a de-salting procedure to obtain a low salt caustic for industrial purposes. Recently, the chlor-alkali industry has focused much of its attention on developing membrane cells to produce low salt-free caustic soda in order to improve quality and avoid costly de-salting processes. Membranes have been developed for that purpose which are substantially hydraulically-impermeable, but which will permit hydrated $Na^+$ ions to be transported from the anolyte portion to the catholyte portion, while substantially preventing transport of $Cl^-$ ions. Such cells are conventionally operated by flowing a brine solution into the anolyte portion and by providing salt-free water to the catholyte portion to serve as the caustic medium. Hydrogen is evolved from the cathode, and chlorine from the anode, regardless of whether a membrane cell or a diaphragm cell is employed.

The media present in the anolyte and catholyte compartments of chlor-alkali cells are exceedingly corrosive. Particularly, there exists a need for a gasket which can withstand the corrosive atmosphere of the anode compartment in as much as the brine, wet chlorine gas and hypochlorites at 180° to 220° F. and pressures from atmospheric to about 50 psig tend to corrode the rubber gasket and result in escalating cell voltage and declining current efficiency.

Prior to the present invention, the gasketing used in chlor-alkali cells was chiefly rubber, including synthetic elastomers. While such rubber or elastomer material worked well initially, after extended periods of use, problems developed within the chlor-alkali cells which were traceable back to the rubber gasketing. For example, contaminants produced by the corrosion of gasketing material caused the operating voltage to increase. Since the production of chlorine and alkali in these cells is very cost related to the cost of electric power required to operate such cells, the chemical resistance of the gaskets to the anolyte became of great importance. By and large, the copolymer or terpolymer elastomer materials seem to exhibit greater resistance to chemical degradation than the rubber materials, e.g., neoprene. For example, ethylene/propylene diene (EPDM) elastomeric rubber gaskets show greater resistance to anolyte degradation than gaskets made of neoprene. However, even these EPDM gaskets were not able to sufficiently resist degradation on the anolyte side of the electrolytic cell. Because of this, the EPDM elastomer gasket life is not projected to any longer extent rubber gaskets, e.g., neoprene.

In an effort to overcome these problems, attempts were made to utilize various forms of polytetrafluoroethylene (PTFE) to serve as a chemically resistant gasket material for the anolyte compartment of chlor-alkali cells. The use of PTFE gaskets, per se, is much more expensive than rubber and elastomer materials and has not proved entirely successful. Moreover, it is difficult to reuse the PTFE material once a cell has been shut down due to other considerations, viz., other than failure or chemical degradation of the PTFE gasket. One such PTFE gasket material which has been utilized in chlor-alkali cells on an experimental basis by the present inventor is a material commercially available in the form of a continuous, low density (like a foam) cord from W. L. Gore and Associates Inc. and is sold as "GORE-TEX." Use of the PTFE gasket material "GORE-TEX" did overcome the chemical attack of the corrosive anolyte; but the cells in which such PTFE gasket was utilized exhibited scortching of the membrane which was observed to lay up against the anode gasket surface. The scortching was apparently due to current leakage through the gasket. Moreover, the use of PTFE did not appear to obtain as tight a seal as was obtainable with the rubber, e.g., neoprene or elastomer, e.g., EDPM, gaskets.

The combination of advantages of (1) resistance to corrosion due to chemical degradation by the anolyte (2) while maintaining low cell voltages and (3) high current efficiency necessary for economic production of chlorine and caustic soda and (4) longer useful gasket life are obtainable in accordance with this invention by the use of a multi-layer gasket comprising an outboard layer of a material having a combination of a Type A Shore Scale Durometer Hardness (ASTM Specification No. D-2240-75) ranging from about 40 to about 70 and a Compression Set (ASTM Specification D-395-69-Method A) of zero plus to about 40 percent in combination with an inboard barrier layer of a material which is corrosion-resistant, noncontaminating and stable upon contact with chlor-alkali cell anolyte wherein said barrier layer is positioned inboard on the anolyte wetted side of the anode gasket. Specific preferred embodiments of this invention enable the use of comparatively small amounts of the far more expensive PTFE or equivalent barrier layer material in the form of a barrier rope or strip positioned on the membrane-facing side of the anode frame and located along the periphery thereof between the rubber or elastomer gasket layer and the anolyte. The rubber or elastomer gasket layer can be in contact with the PTFE barrier layer or it can be separated therefrom (as shown in both figures of the drawing). The advantages obtainable utilizing the multi-layer gasket of this invention are such that no decline in cell performance due to chemical degradation was observed on these gaskets used for the anode compartment after testing in a commercial scale sized chlor-alkali cell for a period of four months. Moreover, the cells in which the multi-layer gaskets of this invention were utilized continued to operate at or near initial operating voltage and current efficiency. Such was not the case for either the neoprene gaskets, per se, the elastomeric EPDM gaskets, per se, or the PTFE gaskets, per se.

DETAILED DESCRIPTION OF THE INVENTION

Figure 1:
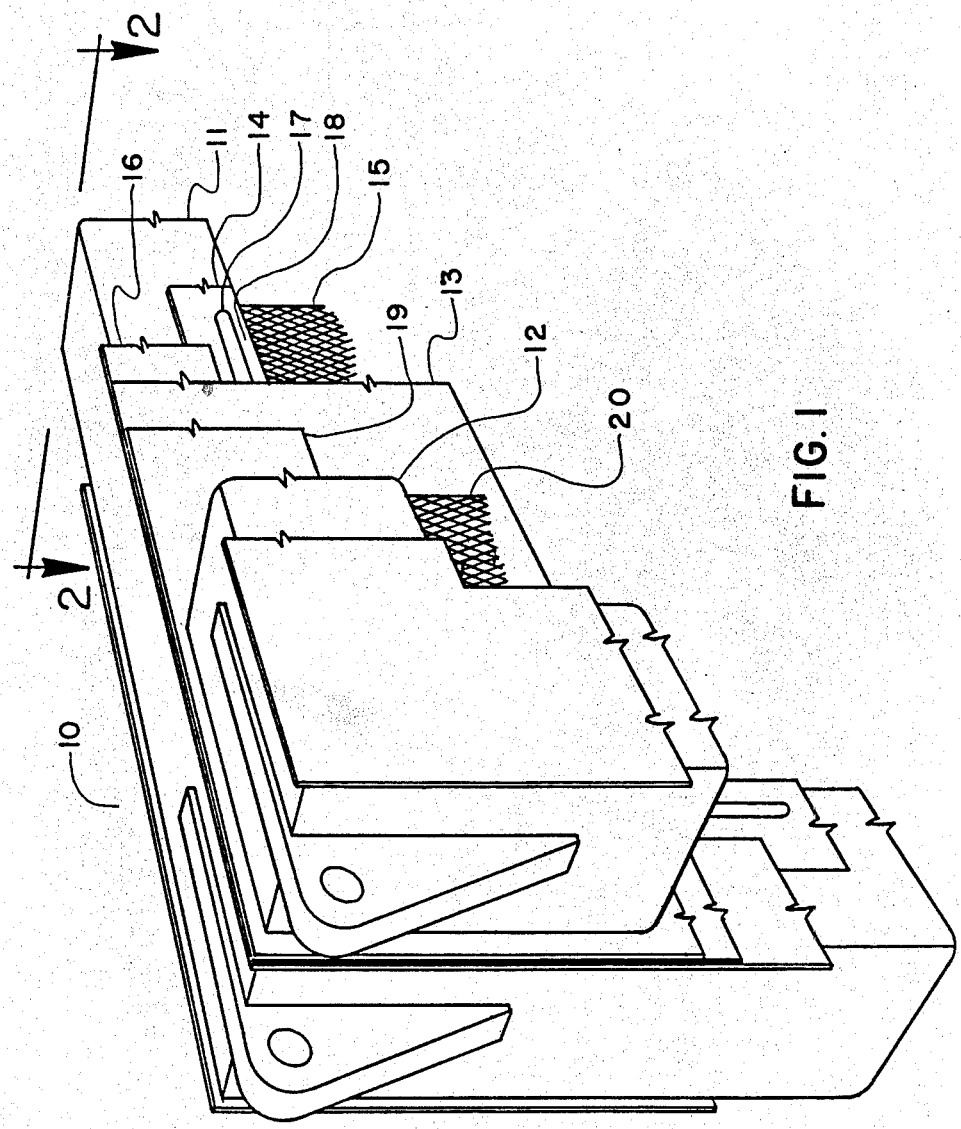
Figure 2:
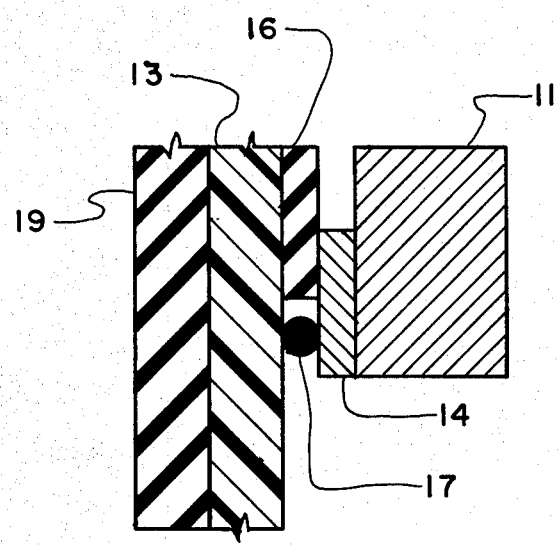

The invention will be illustrated in greater detail in the drawings in which FIG. 1 is a partially cut away perspective view partly in section of a corner of a monoplanar electrolyzer showing the various main components of a chlor-alkali cell. FIG. 2 is a sectional view of the cell of FIG. 1 taken along the line 2—2 thereof and illustrates the position of the rubber or elastomer gasket layer and PTFE gasket layer on the anode side of the cell separated by the cell membrane from the rubber or elastomer gasket layer on the cathode side of said cell. As shown in FIG. 1, cell 10 contains anode frame 11, e.g., made of steel, titanium, etc., and cathode frame 12, e.g., made of steel or equivalent material. Between these frames, there is located a membrane 13, which can be made of a polymeric material such as "Nafion." Contacting the interior surface of 11 is anode liner, e.g., titanium liner, 14 to which there is attached titanium anode mesh 15, said attachment being by welding the mesh to the anode liner at positions (not shown). In order to effect sealing at the periphery of the anode, there are arranged a layer of rubber or elastomer 16 which is in contact with anode frame 11 and membrane 13 and a barrier layer 17 of PTFE or equivalent material, the assembly of 16 and 17 comprising the anode gasket combination. As shown in FIG. 1, barrier (inboard) layer 17 is provided in the form of a flattened strip or rope which can be attached, bonded or otherwise placed in intimate contact on its one side with the anolyte-wetted edge of inwardly facing portion 18 of the anode frame. Portion 18 may be partly covered by anode liner 14 in which case inboard barrier layer 17 contacts it. On its other side, inboard barrier layer 17 is in contact with membrane 13. The "business" or "working" side of the barrier layer is contacted by the corrosive anolyte media and thus inboard layer 17 protects outboard gasket layer 16 from the anolyte. This is a very economical gasket structure since the strip or rope configuration of barrier layer 17 (inboard anode gasket layer) minimizes the use of the more expensive PTFE material. However, it should be realized that other gasket configurations can be used for gasket barrier layer 17.

On the cathode side of membrane 13, there is cathode gasket 19, e.g., made of rubber or elastomer materials, such as neoprene, EPDM, etc., in contact on its one side with membrane 13 and on its other side with cathode 20, which can be made of steel mesh or equivalent material whether mesh or not. The cathode 20 is positioned largely within cathode frame 12, e.g., made of steel, etc.

Any material can be used for the outboard layer 16 of the anode gasket so long as it has a Durometer Hardness (Type A Shore Scale as per ASTM Specification No. D-2240-75) ranging from about 40 to about 70 combined with a Compression Set (ASTM Specification D-395-69-Method A) of zero plus to about 40 percent, with zero being ideal but unattained and wherein Compression Set means the percent of reduction of original thickness when subjected to the load, temperature, pressure and for the period of time set forth in ASTM D-395-69. Preferred classes of outboard gasket layer materials are rubbers and elastomers having the aforementioned combination of Durometer Hardness and Compression Set.

In addition to PTFE and other fluorine-containing polymers, e.g., fluorinated ethylene/propylene copolymer (FEP) and perfluoroalkoxy resin (PFA), the barrier layer 17 can be made of any corrosion-resistant, non-contaminating material which is stable upon contact with the anolyte media present in such electrolytic cell.

Gasket layer 16 can be made from rubber or elastomer materials. Suitable rubber and elastomer materials which can be employed in accordance with this invention include, but are limited to, the following: neoprene, butyl rubber, styrene-butadiene rubber (SBR), natural rubbers, silicone rubber, polysulfide polymers, EPDM, polyvinyl chloride, fluoroelastomers ("Viton"), chlorosulfonated polyethylenes ("Hypalon"), etc., having a combination of a Shore A Scale Durometer Hardness of about 40 to about 70 with a Compression Set of zero plus to about 40 percent.

It is also within the purview of this invention to use PTFE, e.g., in the "GORE-TEX" form to protect the cell membrane from sharp portions of the cell structure, e.g., welds, etc. In such cases, the PTFE is used as a padding and placed between said cell portions and said membrane. The GORE-TEX can be used alone (as a single layer) or in conjunction with a rubber or elastomer layer, e.g., neoprene or EPDM, as a multi-layer padding.

The invention will be illustrated futher in the examples which follow. In these examples, all parts, percents and ratios are by weight unless otherwise indicated.

EXAMPLE 1

The electrolyzer was a monopolar membrane cell of the filter press type containing 6 anode chambers and 7 cathode chambers. Each anode and cathode chamber had approximately 1.4 $M^2$ of active surface. This electrolyzer had 16.8 $M^2$ of active membrane area since it had 12 membranes. Both the anode and cathode gaskets were made of sheet neoprene rubber (with no joints) and a Compression Set of approximately 25 percent having a Type A Shore Scale Hardness of 50 (ASTM Specificaion D-2240-75). The gaskets had inside dimensions of 47 inches and outside dimensions of 55¼ inches by 55¼ and a 1/16 inch thickness. The gaskets were glued to the appropriate anode and cathode surfaces with rubber adhesive. The anodes and cathodes were stacked alternatively with membranes inserted therebetween. End bulkheads were added and tie rods used to compress the stack. Anolyte and catholyte media were then added and the power turned onto operate the electrolyzer.

After approximately 30 days on line using a 180 to 300 grams per liter brine, a 32 percent (sodium hydroxide) caustic, temperatures ranging from 170° to 190° F. and a load of 53 kiloamperes (equivalent to 2 amps/in$^2$ or 3.1 $KA/M^2$), the anode gaskets showed corrosion (chlorinated rubber) on the wetted edges. Also current efficiency declined and cell voltage increased at least in part attributable to impurities due to anode gasket corrosion.

EXAMPLE 2

The test procedure of Example 1 was repeated except using a peroxide cured EPDM elastomer having low calcium content for both the anodes and cathodes. Again after 30 days on line use under the operating conditions as in Example 1, the anode gaskets corroded. However, during the testing period, no voltage elevation or decline in current efficiency was observed.

EXAMPLE 3

The electrolyzer used was as described in Example 1. The cathode was gasketed with neoprene of 50 durometer hardness and a Compression Set of 25 percent and had inside dimensions of 47 inches by 47 inches and outside dimensions of 55¼ by 55¼ inches and a 1/16 inch thickness. The anode gasket surfaces were gasketed with PTFE ("GORE-TEX"), per se, by applying a ¼ inch diameter "GORE-TEX" rope thereto. The PTFE rope was lapped at its end for a seal. The electrolyzer was assembled as in Example 1. After testing on line for 30 days as in Example 1, upon disassembly the membrane was seen to be scortched in the PTFE gasket area where it had been pressed against the anode gasket surface. The scortching was attributed to electrical shorting in the gasket area.

EXAMPLE 4

The electrolyzer used herein was as described in Example 1. The cathodes were gasketed with 50 durometer neoprene having a Compression Set of 25 percent, had 47 inches inside dimension, 55¼ inches by 55¼ inches outside dimensions and a 1/16 inch thickness. The anodes were gasketed using 50 durometer neoprene sheets having inside dimensions of 48½ inches by 48½ inches, outside dimensions of 55¼ inches and a 1/16 inch thickness in combination with a ¼ inch diameter PTFE ("GORE-TEX") rope applied to the interiorly located anode surface (which constitutes the portion to be wetted by the anaolyte). This PTFE rope extended around the entire anode inner periphery and was lapped to seal at the ends. The same assembly procedure was used as in Example 1.

After operation under the same conditions as in Example 1 but for approximately 50 days on line, the anode gaskets showed no corrosion, the cell membranes were not scortched, cell performance was consistently good and there was neither decline in current efficiency nor elevation of operating voltage attributable to anode gasket corrosion.

EXAMPLE 5

The same electrolyzer and assembly was used herein as in Example 4 except that EPDM elastomer was used in place of neoprene for both the cathode gasket and the corresponding anode gasket layer. Thus the anode gasket was a combination of EPDM and PTFE. After testing for 50 days on line, essentially the same results were obtained as in Example 4.

EXAMPLE 6

The test procedure of Example 4 was repeated using the same electrolyzer and assembly procedure as in Example 4 except that EPDM elastomer was used as the cathode gasket maerial and hence the anode gasket was a combination of neoprene and PTFE (GORE-TEX) rope as in Example 4. After 50 days on line operation as in Example 4, essentially the same results were achieved as in Example 4.

I claim:

1. A multi-layer gasket structure for an electrode comprising an outboard layer of a material having a combination of a Type A Shore Scale Durometer Hardness (ASTM Specification No. D-2240-7) ranging from about 40 to about 70 and a Compression Set (ASTM Specification D-395-69-Method A) of zero plus to about 40 percent and an inboard barrier layer of a material which is corrosion-resistant, noncontaminating and stable upon contact with chlor-alkali cell anolyte.

2. A gasket as in claim 1 wherein said outboard gasket layer comprises rubber or elastomer.

3. A gasket as in claim 1 wherein said inboard gasket layer comprises polytetrafluoroethylene.

4. A gasket as in claim 3 wherein said polytetrafluoroethylene is a rope or ribbon thereof.

5. A gasket as in claim 2 wherein said outboard gasket material is rubber.

6. A gasket as in claim 2 wherein said outboard gasket material is an elastomer.

7. A gasket as in claim 5 wherein said rubber is neoprene.

8. A gasket as in claim 6 wherein said elastomer is a polymer of ethylene, propylene and a diene.

9. A gasket as in claim 1 wherein said outboard and inboard gasket layers are spaced apart from one another.

10. A gasket as in claim 1 wherein said outboard and inboard gasket layers contact one another.

11. A gasket as in claim 1 wherein the electrode being gasketed is an anode.

* * * * *